(12) United States Patent
Lee et al.

(10) Patent No.: US 9,392,326 B2
(45) Date of Patent: Jul. 12, 2016

(54) IMAGE PROCESSING APPARATUS, CONTROL METHOD THEREOF, AND IMAGE PROCESSING SYSTEM USING A USER'S VOICE

(71) Applicant: SAMSUNG ELECTRONICS CO., LTD., Suwon-si (KR)

(72) Inventors: Joo-yeong Lee, Yongin-si (KR); Sang-shin Park, Seoul (KR); Jong-cheol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 164 days.

(21) Appl. No.: 14/045,438

(22) Filed: Oct. 3, 2013

(65) Prior Publication Data
US 2014/0200896 A1    Jul. 17, 2014

(30) Foreign Application Priority Data

Jan. 17, 2013 (KR) ........................ 10-2013-0005314

(51) Int. Cl.
*H04N 21/488* (2011.01)
*H04N 21/439* (2011.01)
*G06F 3/16* (2006.01)
*H04N 5/445* (2011.01)
(Continued)

(52) U.S. Cl.
CPC ............ *H04N 21/4394* (2013.01); *G06F 3/167* (2013.01); *G10L 15/30* (2013.01); *H04N 5/44513* (2013.01); *H04N 21/42203* (2013.01); *H04N 21/4396* (2013.01); *H04N 21/4852* (2013.01); *H04N 21/4882* (2013.01); *H04N 2005/44517* (2013.01)

(58) Field of Classification Search
None
See application file for complete search history.

(56) References Cited

U.S. PATENT DOCUMENTS 5,890,122 A      3/1999   Van Kleeck et al.
7,299,187 B2 *  11/2007   Tahara et al. ................. 704/275
(Continued)

FOREIGN PATENT DOCUMENTS

WO         03/030148 A1    4/2003

OTHER PUBLICATIONS

International Search Report for PCT/KR2013/009100 dated Feb. 28, 2014 [PCT/ISA/210].
(Continued)

*Primary Examiner* — Jeremiah Bryar
(74) *Attorney, Agent, or Firm* — Sughrue Mion, PLLC (57) ABSTRACT

An image processing apparatus includes an image processor; an audio input to input a user's speech; a storage to store at least one simple sentence voice command and an operation corresponding to the simple sentence voice command; a communication device to communicate with a server that analyzes a descriptive sentence voice command and determine an operation corresponding to the descriptive sentence voice command; an audio processor to process a first voice command corresponding to the speech and conduct the operation corresponding to the simple sentence voice command if the first voice command is the simple sentence voice command, and to transmit the first voice command to the communication device if the first voice command is not the simple sentence voice command; and a controller configured to display a first guide image which recommends the simple sentence voice command stored in the storage if the corresponding operation for the first voice command determined by the server is identical to one of the at least one simple sentence voice command stored in the storage.

14 Claims, 9 Drawing Sheets

(51) Int. Cl.
   *H04N 21/422*   (2011.01)
   *H04N 21/485*   (2011.01)
   *G10L 15/30*    (2013.01)

(56) References Cited

U.S. PATENT DOCUMENTS

| | | |
|---|---|---|
| 8,244,828 B2 | 8/2012 | Anderson et al. |
| 2002/0174177 A1* | 11/2002 | Miesen et al. ............... 709/203 |
| 2003/0078784 A1 | 4/2003 | Jordan et al. |
| 2003/0154077 A1* | 8/2003 | Tahara .................. G10L 15/10 704/239 |
| 2007/0061149 A1 | 3/2007 | Chang |
| 2008/0120112 A1 | 5/2008 | Jordan et al. |
| 2009/0253463 A1 | 10/2009 | Shin et al. |
| 2010/0009719 A1 | 1/2010 | Oh et al. |
| 2011/0067059 A1 | 3/2011 | Johnston et al. |
| 2011/0270615 A1 | 11/2011 | Jordan et al. |
| 2012/0162540 A1* | 6/2012 | Ouchi .................... G10L 15/30 348/734 |
| 2013/0211836 A1 | 8/2013 | Jordan et al. |
| 2014/0019130 A1 | 1/2014 | Jordan et al. |
| 2015/0106836 A1 | 4/2015 | Jordan et al. |

OTHER PUBLICATIONS

Communication dated May 27, 2015 issued by the European patent Office in counterpart European Patent Application No. 14150579.2.

* cited by examiner

| NO. | COMMAND | OPERATION |
|---|---|---|
| 1 | TURN ON | TURN ON SYSTEM |
| 2 | TURN OFF | TURN OFF SYSTEM |
| 3 | CHANNEL FORWARD | SWITCH TO NEXT CHANNEL |
| 4 | CHANNEL BACKWARD | SWITCH TO PREVIOUS CHANNEL |
| 5 | BE QUIET | MUTE |
| 6 | I CAN'T HEAR IT | VOLUME+5 |
| . . . | . . . | . . . |

IMAGE PROCESSING APPARATUS, CONTROL METHOD THEREOF, AND IMAGE PROCESSING SYSTEM USING A USER'S VOICE

CROSS-REFERENCE TO RELATED APPLICATION

This application claims priority from Korean Patent Application No. 10-2013-0005314, filed on Jan. 17, 2013 in the Korean Intellectual Property Office, the disclosure of which is incorporated herein by reference.

BACKGROUND

1. Field

Apparatuses and methods consistent with the exemplary embodiments relate to an image processing apparatus which processes an image signal including a broadcast signal received from an external source to display an image, a control method thereof, and an image processing system, and more particularly to an image processing apparatus which perceives a user's speech and performs a function or operation corresponding to the speech, a control method thereof, and an image processing system.

2. Description of the Related Art

An image processing apparatus processes image signals or image data received from an external source according to various types of image processing processes. The image processing apparatus may display an image based on the processed image signal on its own display panel or output the processed image signal to a display apparatus including a panel to display an image based on the image signal. That is, the image processing apparatus may include any device which processes an image signal, regardless of whether it includes a panel to display an image or not. An example of an image processing apparatus having a display panel is a television (TV), while an example of an image processing apparatus which does not have a display panel is a set-top box.

As a variety of additional and extended functions are continuously added to an image processing apparatus with technological developments, diverse configurations and methods of inputting user's desired commands to the image processing apparatus are suggested accordingly. In the related art, when a user presses a key or button on a remote controller, the remote controller transmits a control signal to an image processing apparatus so that a user's desired operation is performed. Currently, various configurations of controlling an image processing apparatus based on a user's desire are proposed. For example, an image processing apparatus detects a motion or voice of a user and analyzes the detected data to perform a relevant operation.

SUMMARY

The foregoing and/or other aspects may be achieved by providing an image processing apparatus including: an image processor configured to process an image signal to display an image; an audio input configured to input a user's speech; a storage configured to store at least one simple sentence voice command and an operation corresponding to the simple sentence voice command; a communication device configured to communicate with a server which analyzes a descriptive sentence voice command and determine an operation corresponding to the descriptive sentence voice command; an audio processor configured to process a first voice command corresponding to the speech to conduct the operation corresponding to the simple sentence voice command stored in the storage if the first voice command is the simple sentence voice command stored in the storage, and to transmit the first voice command to the communication device if the first voice command is not the simple sentence voice command stored in the storage; and a controller configured to display a guide image which recommends the simple sentence voice command corresponding to the corresponding operation stored in the storage if the corresponding operation determined by the server is the corresponding operation stored in the storage.

According to the exemplary embodiment, the storage may store a list of the simple sentence voice commands and the corresponding operations, and the audio processor may retrieve information regarding whether the first voice command is in the list and transmit the first voice command to the communication device if the first voice command is not retrieved from the list.

According to another aspect of the exemplary embodiments, the controller may determine the operation corresponding to the first voice command according to a control command transmitted from the server based on the first voice command.

According to another aspect of the exemplary embodiments, a time from a point when the speech is input to the audio input to a point when the corresponding operation is performed may be shorter when the first voice command is the simple sentence voice command than when the first voice command is not the simple sentence voice command.

According to the exemplary embodiment, the controller may display the guide image that recommends a preset second voice command when a plurality of voice commands respectively corresponding to a plurality of speeches are sequentially input in a state that a preset corresponding operation is set to be performed depending on when the plurality of voice commands are sequentially input or when the second voice command is input.

According to another aspect of the exemplary embodiments, the communication device may communicate with a speech-to-text (STT) server to convert the speech into a voice command of a text form, and the controller may transmit an audio signal of the speech to the STT server and receive the voice command corresponding to the speech from the STT server when the speech is input to the audio input.

According to an aspect of the exemplary embodiments, the image processing apparatus may further include a display to display the image signal processed by the image processor as an image.

According to another aspect of the exemplary embodiments, there is provided a control method of an image processing apparatus including: inputting a user's speech; performing an operation corresponding to a simple sentence voice command stored in the image processing apparatus when a first voice command corresponding to the speech is the simple sentence voice command stored in the image processor; and transmitting the first voice command to a server that analyzes a descriptive sentence voice command and determines an operation corresponding to the descriptive sentence voice command if the first voice command corresponding to the speech is not the simple sentence voice command stored in the image processor, wherein the transmitting the first voice command to the server includes displaying a guide image which recommends the simple sentence voice command corresponding to the corresponding operation if the corresponding operation determined by the server is the corresponding operation stored in the image processing apparatus.

According to another aspect of the exemplary embodiments, the image processing apparatus may store a list of the simple sentence voice commands and the corresponding operations, and the transmitting the first voice command to the server comprises transmitting the first voice command if the first voice command is not retrieved from the list.

According to an aspect of the exemplary embodiments, the displaying the guide image which recommends the simple sentence voice command corresponding to the corresponding operation may include determining the operation corresponding to the first voice command according to a control command transmitted from the server based on the first voice command.

According to an aspect of the exemplary embodiments, a time from a point when the speech is input to the audio input to a point when the corresponding operation is performed may be shorter when the first voice command is the simple sentence voice command than when the first voice command is not the simple sentence voice command.

According to an aspect of the exemplary embodiment, the displaying the guide image which recommends the simple sentence voice command corresponding to the corresponding operation may include displaying the guide image that recommends a preset second voice command when a plurality of voice commands respectively corresponding to a plurality of speeches are sequentially input in a state that a preset corresponding operation is set to be performed depending on when the plurality of voice commands are sequentially input or when the second voice command is input.

The inputting the user's speech may include transmitting an audio signal of the speech to a speech-to-text (STT) server to convert the speech into a voice command of a text and receiving the voice command corresponding to the speech from the STT server.

According to another aspect of the exemplary embodiments, there is provided an image processing system including an image processing apparatus configured to process an image signal to display an image; and a server configured to communicate with the image processing apparatus, wherein the image processing apparatus comprises an audio input configured to input a user's speech; a storage configured to store at least one simple sentence voice command and an operation corresponding to the simple sentence voice command; a communication device configured to communicate with the server that analyzes a descriptive sentence voice command and determine an operation corresponding to the descriptive sentence voice command; an audio processor configured to process a first voice command corresponding to the speech to conduct the operation corresponding to the simple sentence voice command stored in the storage if the first voice command is the simple sentence voice command stored in the storage, and configured to transmit the first voice command to the communication device if the first voice command is not the simple sentence voice command stored in the storage; and a controller configured to display a guide image which recommends the simple sentence voice command corresponding to the corresponding operation stored in the storage if the corresponding operation determined by the server is the corresponding operation stored in the storage.

According to another aspect of the exemplary embodiments there is provided an image processing apparatus including: a display; an audio input configured to input a user's speech; and a controller configured to perform a preset first operation if a voice command corresponding to the speech is any one of a first voice command of a simple sentence and a second voice command of a descriptive sentence, wherein the controller displays a guide image which recommends the first voice command on the display if the voice command is the second voice command.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 1:
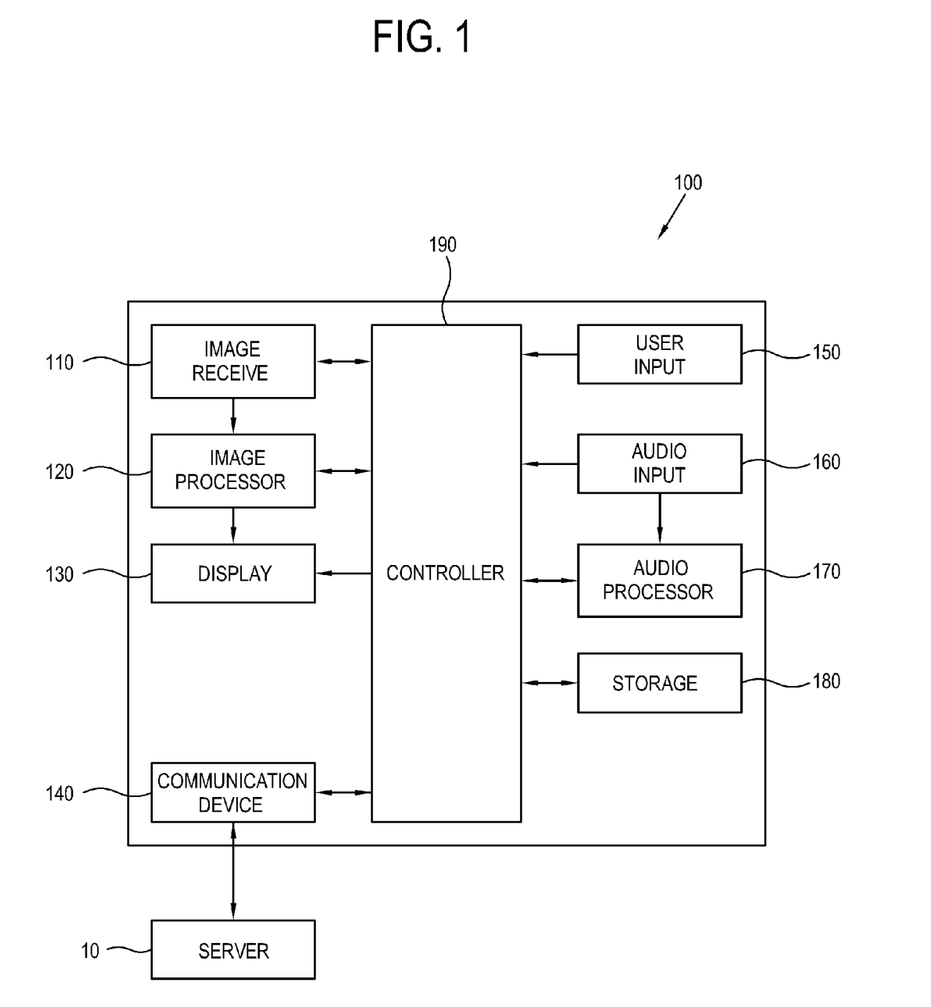
FIG. 1 is a block diagram illustrating a configuration of an image processing apparatus according to a first exemplary embodiment.

FIG. 1 is a block diagram illustrating a configuration of an image processing apparatus 100 according to a first exemplary embodiment.

Although the present exemplary embodiment will be illustrated with a display apparatus 100 which autonomously displays an image, the present exemplary embodiment may also be applied to an image processing apparatus which does not autonomously display an image, but outputs image signals or control signals to a separate display apparatus, without being limited to the following description. In the present exemplary embodiment, the image processing apparatus 100 is configured as a TV, but various modifications and alternations may be also adopted for the same reason.

As shown in FIG. 1, the image processing apparatus 100 or the display apparatus 100 according to the present exemplary embodiment receives an image signal from an image source (not shown). The display apparatus 100 may receive any image signal, which is not limited to a particular kind or a particular characteristic. For example, the display apparatus 100 may receive a broadcast signal transmitted from a transmitter (not shown) of a broadcasting station and tune the broadcast signal to display a broadcast image.

The display apparatus 100 includes an image receiver 110 receiving an image signal from the image source (not shown), an image processor 120 processing the image signal received by the image receiver 110 according to a preset image processing process, a display 130 displaying an image based on the image signal processed by the image processor 120, a communication device 140 communicating with an external device, such as a server 10, a user input 150 manipulated by a user, an audio input 160 to input a voice or a sound from an external source, an audio processor 170 interpreting and processing the voice or sound input to the audio input 160, a storage 180 storing data or information, and a controller 190 controlling general operations of the display apparatus 100.

The image receiver 110 receives an image signal or image data via a cable or wirelessly and transmits the image signal or image data to the image processor 120. The image receiver 110 may be configured as various types corresponding to standards of image signals and configurations of the display apparatus 100. For example, the image receiver 110 may receive a radio frequency (RF) signal or various image signals in accordance with composite video, component video, super video, SCART, high definition multimedia interface (HDMI), DisplayPort, unified display interface (UDI) or wireless HD standards. When an image signal is a broadcast signal, the image receiver 110 includes a tuner tuning the broadcast signal by each channel.

The image processor 120 performs various image processing processes on an image signal received by the image receiver 110. The image processor 120 outputs a processed image signal to the display panel 130, so that an image based on the image signal is displayed on the display panel 130. For example, when the image receiver 110 tunes a broadcast signal to a particular channel, the image processor 120 extracts image, audio and optional data corresponding to the channel from the broadcast signal, adjusts the data to a preset resolution, and display the data on the display 130.

The image processor 120 may perform any kind of image processing, for example, decoding corresponding to an image format of image data, de-interlacing to convert interlaced image data into a progressive form, scaling to adjust image data to a preset resolution, noise reduction to improve image quality, detail enhancement, frame refresh rate conversion, or the like.

The image processor 120 may be provided as an integrated multi-functional component, such as a system on chip (SOC), or as an image processing board (not shown) formed by mounting separate components which independently conduct individual processes on a printed circuit board and be embedded in the display apparatus 100.

The display 130 displays an image based on an image signal output from the image processor 120. The display 130 may be configured in various display modes using liquid crystals, plasma, light emitting diodes, organic light emitting diodes, a surface conduction electron emitter, a carbon nanotube, nano-crystals, or the like, without being limited thereto.

The display 130 may further include an additional component depending on its display mode. For example, when in a display mode using liquid crystals, the display 130 includes a liquid display panel (not shown), a backlight unit (not shown) providing light to the display panel, and a panel driving board (not shown) driving the panel.

The communication device 140 performs data transmission or reception so that the display apparatus 100 conducts two-way communications with the server 10. The communication device 140 is connected to the server 10 via a cable or wirelessly through a Wide Area Network (WAN) or Local Area Network (LAN) or in a local connection mode based on a communication protocol of the server 10.

The user input 150 transmits various preset control commands or information to the controller 190 by user's manipulations and inputs. The user input 150 may be provided as a menu key or an input panel installed on an outside of the display apparatus 100 or as a remote controller separate from the display apparatus 100. Alternatively, the user input 150 may be configured as a single body with the display 130. When the display 130 is a touch screen, a user may transmit a preset command to the controller 190 by touching an input menu (not shown) displayed on the display 130.

The audio input 160 may be configured as a microphone and detects various sounds produced in an external environment of the display apparatus 100. The sounds detected by the audio input 160 include a speech of a user and sounds produced by various factors other than the user.

The audio processor 170 performs a process with respect to a voice or sound input to the audio input 160 among various preset processes conducted by the display apparatus 100. Here, the term "voice" processed by the audio processor 170 refers to any sound input to the audio input 160. When the image processor 120 processes an image signal, the image signal may include audio data, which is processed by the image processor 120.

When a voice or sound is input to the audio input 160, the audio processor 170 determines whether the voice or sound is a speech of a user or a sound produced by a different factor. Such a determination may be made according to various methods, without being particularly limited. For example, the audio processor 170 may determine whether the input voice or sound corresponds to a wavelength or frequency band corresponding to a voice of a person or corresponds to a voice profile of a user designated in advance.

When the input voice or sound is the speech of the user, the audio processor 170 performs a process to conduct a preset corresponding operation based on a voice command corresponding to the speech. Here, the voice command means content of the speech, which will be described in detail.

The present exemplary embodiment illustrates that the audio processor 170 and the image processor 120 are separate components. However, such components are functionally divided for convenience so as to clarify the present exemplary embodiment, and the image processor 120 and the audio processor 170 may not necessarily be separated in the display apparatus 100. That is, the display apparatus 100 may include a signal processor (not shown) in which the image processor 120 and the audio processor 170 are integrated.

The storage 180 stores unlimited data according to control by the controller 190. The storage 180 is configured as a nonvolatile memory, such as a flash memory and a hard disk drive, but is not limited thereto. The storage 180 is accessed by the controller 190, the image processor 120 or the audio processor 170, and data stored in the storage 180 may be read, recorded, revised, deleted, or updated.

When the speech of the user is input through the audio input 160, the controller 190 controls the audio processor 170 to process the input speech. Here, when the speech is input, the controller 190 determines whether a voice command corresponding to the speech is a simple sentence or a descriptive sentence and controls the voice command to be processed by the audio processor 170 or the server 10 based on a determination result. In detail, when the voice command is a simple sentence, the controller 190 controls the audio processor 170 to process the voice command. When the voice command is a descriptive sentence, the controller 190 transmits the voice command to the server 10 through the communication device 140 so that the server 10 processes the voice command.

Figure 2:
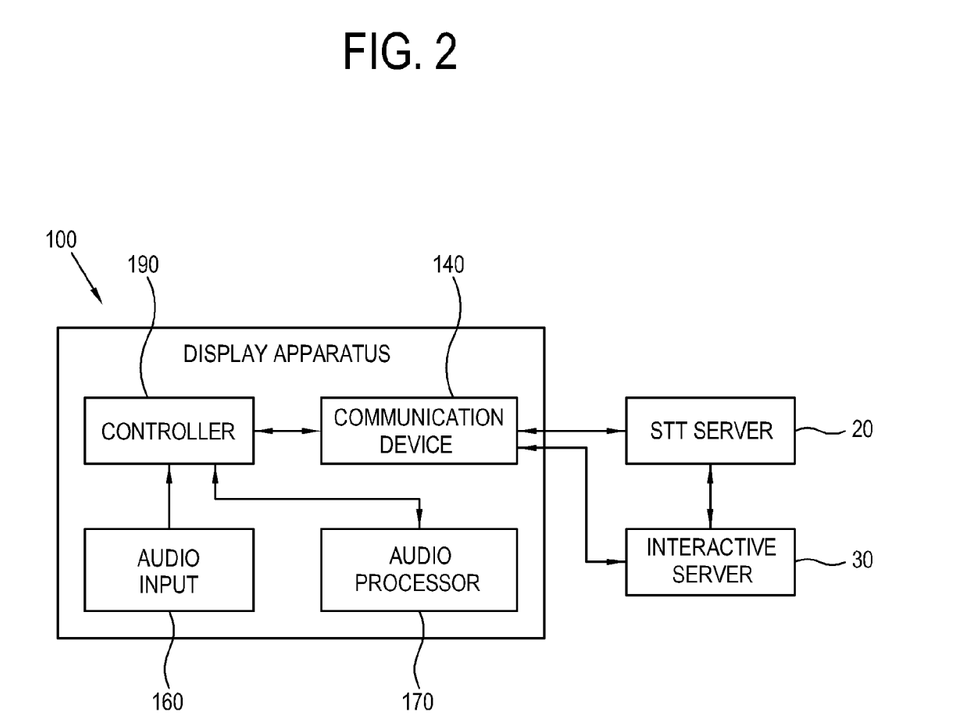
FIG. 2 is a block diagram illustrating interaction between the display apparatus and servers of FIG. 1.

FIG. 2 is a block diagram illustrating interaction between the display apparatus 100 and servers 20 and 30.

As shown in FIG. 2, the display apparatus 100 includes the communication device 140, the audio input 160, the audio processor 170, and the controller 190. Such a configuration has been illustrated above with reference to FIG. 1. Here, the communication device 140 is connected to a speech-to-text (STT) server 20 which converts a speech of the user into a voice command and an interactive server 30 analyzes the voice command and determines an operation corresponding to the voice command.

When an audio signal is received, the STT server 20 analyzes a waveform of the audio signal and generates content of the audio signal into a text. When an audio of a speech of the user is received from the display apparatus 10, the STT server 20 converts the audio signal into a voice command.

The interactive server 30 includes a database of various operations of the display apparatus 100 corresponding to voice commands. The interactive server 30 analyzes a voice command received from the display apparatus 100 and transmits a control signal to conduct an operation corresponding to the voice command to the display apparatus 100 based on an analysis result.

When a speech of the user is input to the audio input 160, the controller 190 transmits an audio signal of the speech to the STT server 20 and receives a voice command corresponding to the speech from the STT server 20.

The controller 190 transmits the voice command received from the STT server 20 to the audio processor 170 so that the audio processor 170 processes the voice command.

The audio processor 170 includes a list or database of various operations or functions corresponding to a plurality of voice commands executable in the display apparatus 100, and the list or database is stored in the storage 180 of FIG. 1. The audio processor 170 searches the list with the transmitted voice command to determine a corresponding operation/or function. When the corresponding operation is retrieved from the list, the audio processor 170 processes the operation to be conducted. The list will be described in detail later.

The voice commands of the list include short simple sentences. If an input voice command is not a simple sentence but a descriptive sentence, the voice command is not retrieved from the list and thus the audio processor 170 may not determine a corresponding operation.

When the voice command is a descriptive sentence, that is, when the voice command is not retrieved from the list so that the audio processor 170 may not process the voice command, the controller 190 transmits the voice command to the interactive server 30. The interactive server 30 analyzes the voice command received from the display apparatus 100 to determine an operation or function of the display apparatus 100 corresponding to the voice command. The interactive server 30 transmits a control signal directing the determined operation to the display apparatus 100 so that the display apparatus 100 conducts the operation according to the control signal.

Accordingly, a preset operation of the display apparatus 100 corresponding to the speech of the user is performed.

A process of selecting a subject that processes the voice command based on whether the voice command is a simple sentence or descriptive sentence may depend on system load and throughput of the display apparatus 100. Since a descriptive sentence is a natural language, it is relatively difficult to mechanically extract a user-desired corresponding operation from the voice command of a descriptive sentence. Thus, since it may not be easy to analyze the voice command based on the descriptive sentence with the limited resources of the display apparatus 100, the voice command of the descriptive sentence is processed by the interactive server 30 to deal with various contents of speeches.

However, such a configuration may be changed and modified variously in design, and thus the display apparatus 100 may autonomously perform at least one process of the STT server 20 or the interactive server 30. For example, the display apparatus 100 may autonomously convert a user's speech into a voice command or analyze a voice command of a descriptive sentence instead of the servers 20 and 30.

With this configuration, the controller 190 controls a process of determining an operation relevant to the voice command corresponding to the user's speech to be processed by the audio processor 170 or the interactive server 30. The following exemplary embodiment illustrates that the controller 190 controls the audio processor 170 to determine an operation of the display apparatus 100 corresponding to a voice command of a simple sentence.

Figure 3:
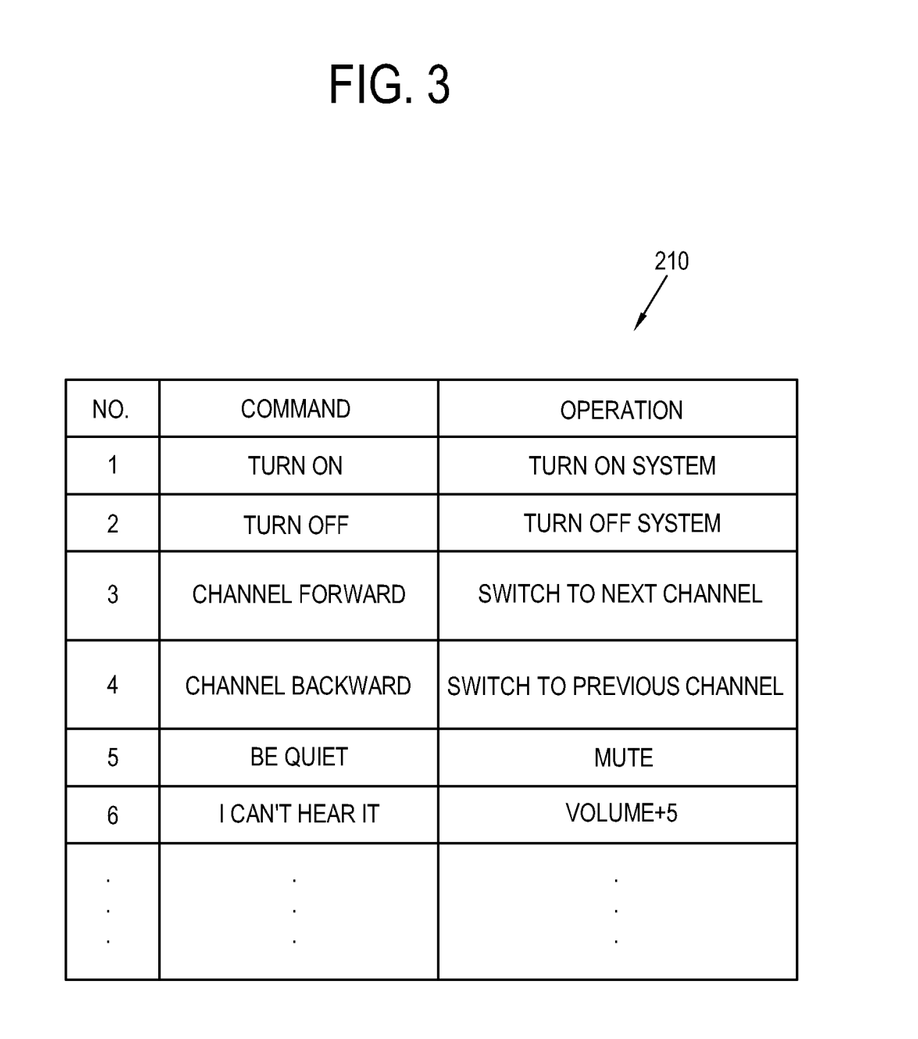
FIG. 3 illustrates a list of operations corresponding to voice commands stored in the display apparatus of FIG. 1.

FIG. 3 illustrates a list 210 of operations corresponding to voice commands stored in the display apparatus 100.

As shown in FIG. 3, the storage 180 stores the list 210 of various functions or operations of the display apparatus 100 relevant to voice commands corresponding to a user's speech. Here, the term "operation" means any kind of process or function that the display apparatus performs and supports.

The audio processor 170 searches the list 210 based on a particular voice command to determine an operation corresponding to the voice command.

The list 210 of the present exemplary embodiment is constructed according to any one illustrative principle or method and thus does not limit the scope of the present exemplary embodiment. Further, the list 210 of FIG. 3 illustrates that a single command corresponds to a single operation, which is provided for convenience to briefly describe the present exemplary embodiment. On the list 210, a plurality of commands may actually correspond to a single operation. Further, numerals of the list 210 are used for convenience to distinguish commands and operations.

For example, if a voice command corresponding to a user's speech is "turn on," the audio processor 170 searches the list 210 using the voice command "turn on," thereby verifying that an operation corresponding to the voice command "turn on" is "turn on the system."

Here, the audio processor 170 may selectively perform the operation in consideration of a current status of the display apparatus 100. If the display apparatus 100 is currently switched on, the audio processor 170 does not perform the operation "turn on the system." On the contrary, if the display apparatus 100 is currently switched off, the audio processor 170 performs the operation to switch on the system.

Alternatively, if the user says "be quiet" while the display apparatus 100 is currently displaying an image, the audio processor 170 may determine that an operation corresponding to the voice command "be quiet" is "mute" on the list 210. Then, the audio processor 170 turns down a volume of the image currently being displayed to 0 so that the mute operation is performed.

Also, if the user says "I can't hear it" while the display apparatus 100 is currently displaying the image, the audio processor 170 confirms that an operation corresponding to the voice command "I can't hear it" is "turn up the volume by five levels" on the list 210. Then, the audio processor 170 turns up the volume of the image currently being displayed by five levels.

In this way, the audio processor 170 may control an operation corresponding to a user's speech to be performed.

Here, the voice commands in the list 210 may be constructed in a simple sentence including simple words. The list 210 may include both simple sentences and various descriptive sentences by adding more information to the list 210.

However, as the information quantity of the list 210 increases, system load of the display apparatus 100 also increases and it takes more time to search the list 210. Further, it is not effective for the display apparatus 100 which is used by individual users to construct the list 210 of the display apparatus 100 to include voice commands based on different users with diverse linguistic habits.

Thus, the controller 190 conducts control such that the voice command is processed primarily by the audio processor 170 or secondarily by the interactive server 30 when it is difficult for the audio processor 170 to process the voice command.

If the voice command is a simple sentence, the voice command is subjected only to a process by the audio processor 170. However, if the voice command is a descriptive sentence or a command that is uttered in different languages, the voice command is subjected to both the process by the audio processor 170 and a process by the interactive server 30.

For example, if the voice command corresponding to the user's speech is "the volume is low," the controller 190 transmits the voice command to the audio processor 170 so that the audio processor 170 performs an operation corresponding to the voice command. However, if the list 210 does not include the voice command "the volume is low," the audio processor 170 may not determine an operation corresponding to the voice command "the volume is low." In this case, the controller 190 transmits the voice command to the interactive server 30 so that the interactive server 30 can analyze the operation corresponding to the voice command.

When the interactive server 30 determines that the operation is "volume +5" as a result of the analysis, the interactive server 30 transmits a control command to conduct the operation to the display apparatus 100. The controller 190 performs an operation of turning up the volume of the image by 5 levels according to the control command received from the interactive server 30.

If the voice command corresponding to the user's speech is "I can't hear it," the audio processor 170 immediately determines the operation "volume +5" on the list 210 without transmitting the voice command to the interactive server 30 since the voice command is included in the list 210.

Thus, regarding a time from a point when a user's speech is input to a point when a corresponding operation is performed, it takes a longer time to process a voice command of a descriptive sentence than to process a voice command of a simple sentence, which may cause inconvenience for a user who wishes to quickly perform the operation when using the display apparatus 100.

Accordingly, the present exemplary embodiment proposes the following method.

If a first voice command corresponding to a speech input to the audio input 160 is a descriptive sentence, the controller 190 performs a first operation, determined by the interactive server 30 to correspond to the first voice command, and displays a guide image recommending a second voice command of a simple sentence corresponding to the first operation. Here, the second voice command may be determined as a voice command corresponding to the first operation on the list 210. That is, if an operation corresponding to a voice command of a descriptive sentence determined by the interactive server 30 is an operation stored in the storage 180, the controller 190 displays a guide image recommending a voice command of a simple sentence corresponding to the operation.

Although the first operation is performed by either the first voice command or the second voice command, the second voice command, which is processed autonomously by the display apparatus 100, may take less time to perform the first operation than the first voice command, processed necessarily by the interactive server 30. The guide image shows the user the second voice command to perform the same operation as the first voice command, thereby inducing the user to speak the second voice command the next time instead of the first voice command.

Figure 4:
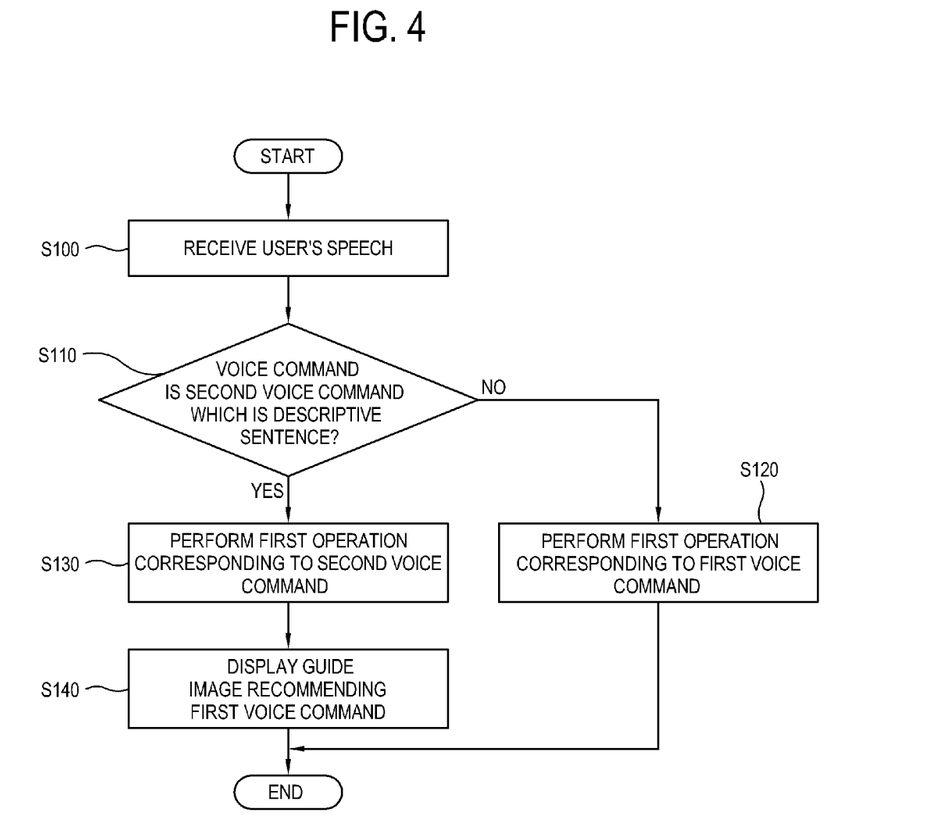
FIG. 4 is a flowchart illustrating a control method of the display apparatus of FIG. 1.

FIG. 4 is a flowchart illustrating a control method of the display apparatus 100 according to the present exemplary embodiment. Here, a voice command to perform a preset first operation of the display apparatus 100 includes a first voice command of a simple sentence and a second voice command of a descriptive sentence.

As shown in FIG. 4, when a user's speech is received (operation S100), the display apparatus 100 determines whether a voice command corresponding to the received speech is the first voice command of the simple sentence or the second voice command of the descriptive sentence (operation S110).

When the received speech is the first voice command of the simple sentence, the display apparatus 100 performs the first operation corresponding to the first voice command according to a preset simple sentence processing process (operation S120).

When the received speech is the second voice command of the descriptive sentence, the display apparatus 100 performs the first operation corresponding to the second voice command according to a preset descriptive sentence processing process (operation S130). Further, the display apparatus 100 displays a guide image recommending the user to use the first voice command of the simple sentence to perform the same first operation instead of using the second voice command (operation S140).

This method may guide and induce the user to use the voice command of the simple sentence involving less time to perform the operation than the voice command of the descriptive sentence.

Here, various simple sentence processing processes and descriptive sentence processing processes may be used. For example, the simple sentence processing process is a process that involves processing a voice command just by the audio processor 170, while the descriptive sentence processing process is a process that involves analyzing a voice command by the interactive server 30.

Figure 5:
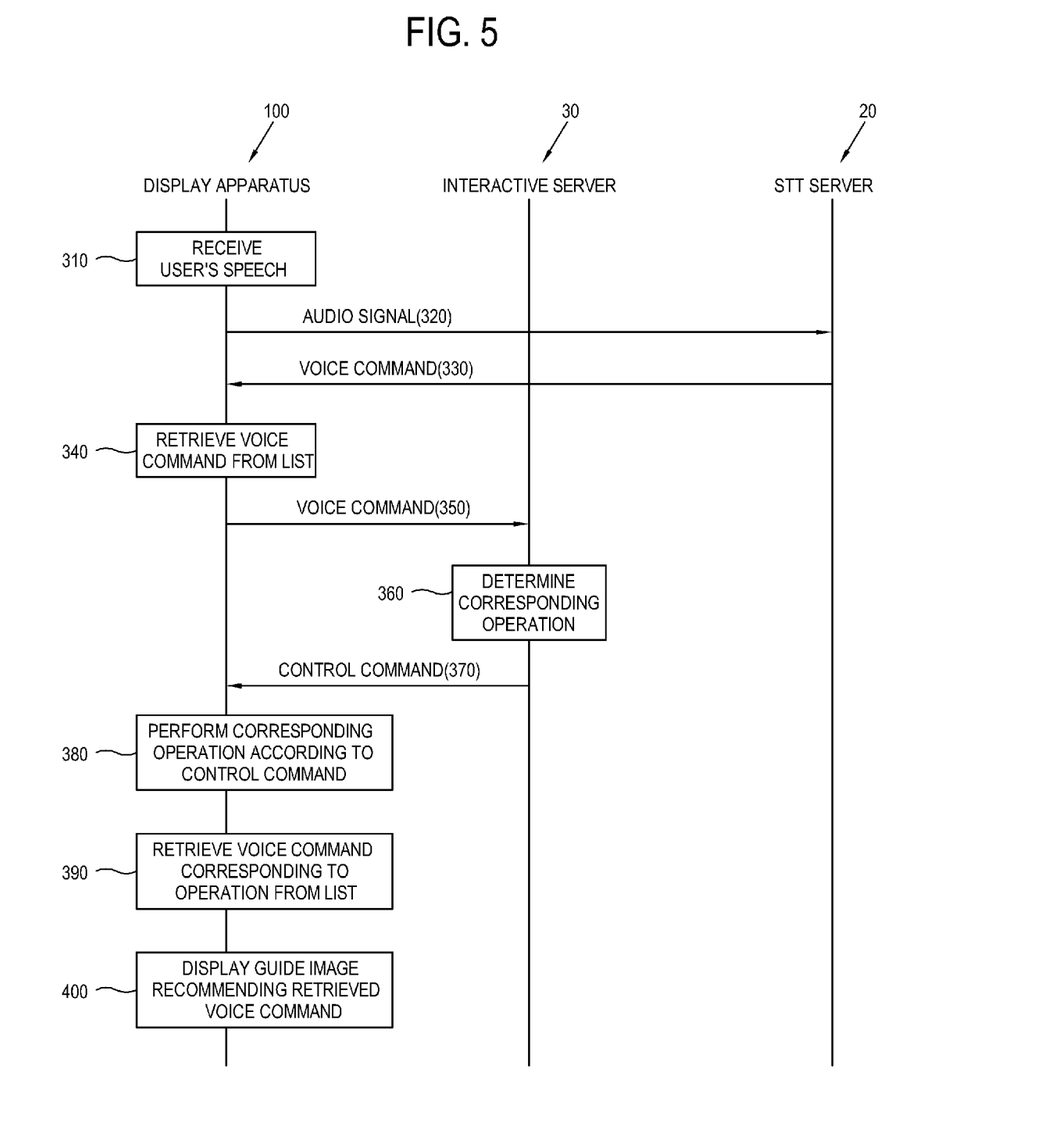
FIG. 5 illustrates a control process of the display apparatus and the interactive server of FIG. 1.

FIG. 5 illustrates a control process of the display apparatus 100 and the interactive server 30 according to the present exemplary embodiment.

As shown in FIG. 5, the display apparatus 100 receives a user's speech (operation 310). The display apparatus 100 transmits an audio signal corresponding to the received user's speech to the STT server 20 (operation 320).

The STT server 20 converts the audio signal transmitted from the display apparatus 100 into a voice command of a text and transmits the converted voice command to the display apparatus 100 (operation 330).

The display apparatus 100 retrieves the voice command received from the STT server 20 from the list 210 of the voice commands and the corresponding operations and determines an operation corresponding to the voice command (operation 340). When the operation corresponding to the voice command is retrieved, the display apparatus 100 performs the operation. When the operation corresponding to the voice command is not retrieved, the display apparatus 100 transmits the voice command to the interactive server 30 (operation 350).

The interactive server 30 analyzes the voice command and determines an operation corresponding to the voice command (operation 360). Various configurations and methods may be used to analyze the voice command of a descriptive sentence so that the interactive server 30 determines the corresponding operation. The interactive server 30 transmits a control command to perform the determined operation to the display apparatus (operation 370).

The display apparatus 100 performs the corresponding operation according to the control command received from the interactive server 30 (operation 380). The display apparatus 100 retrieves a voice command corresponding to the performed operation from the list (operation 390) and displays a guide image recommending the retrieved voice command (operation 400).

Figure 6:
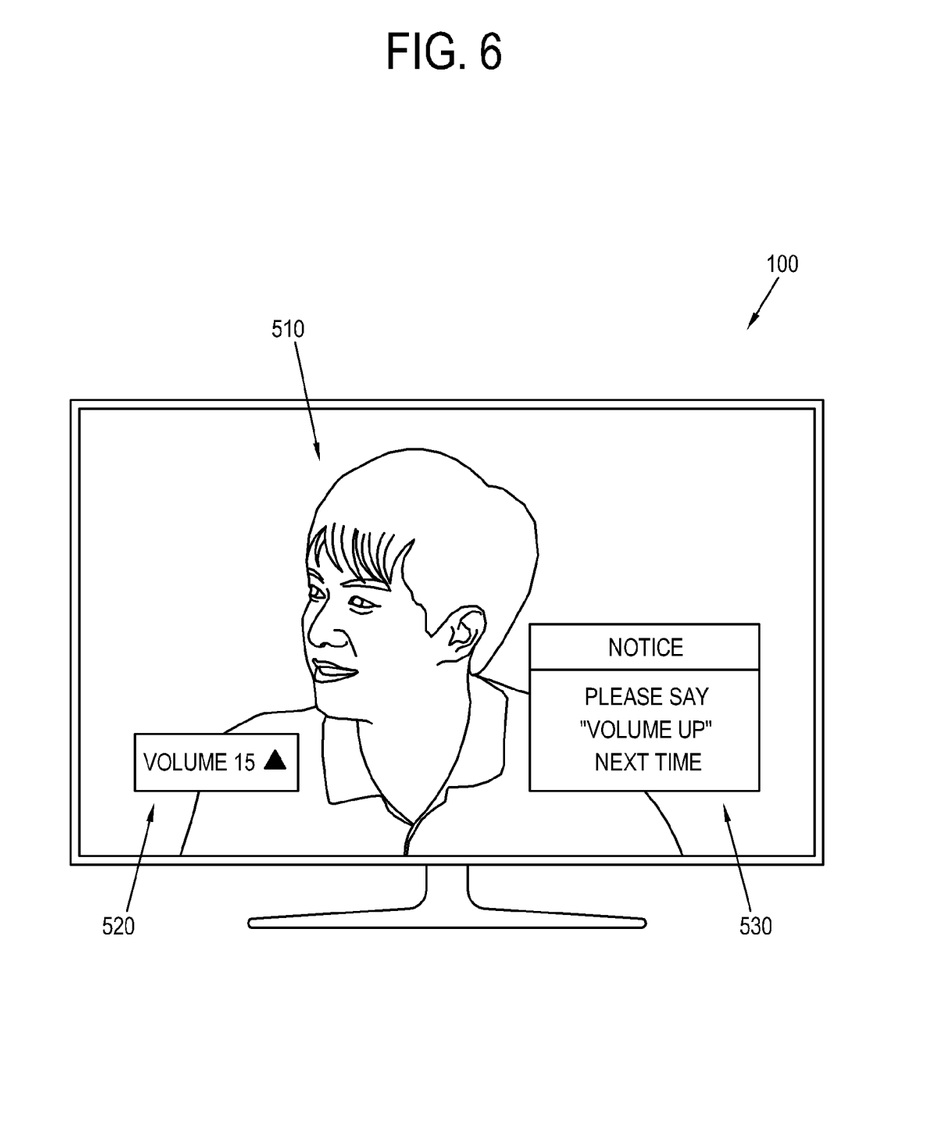
FIG. 6 illustrates a guide image displayed on the display apparatus of FIG. 1.

FIG. 6 illustrates a guide image 530 displayed on the display apparatus 100.

As shown in FIG. 6, the guide image 530 may be displayed along with an image 520 relevant to an operation corresponding to a voice command when the operation is performed or after the operation is performed.

For example, consider that with an operation corresponding to a voice command of a simple sentence "volume up" set to "volume +3," the same "volume +3" operation is also performed corresponding to a voice command of a descriptive sentence "please turn up the sound." In this case, a first voice command of a simple sentence is "volume up," a second voice command of a descriptive sentence is "please turn up the sound," and an operation corresponding to the first voice command and the second voice command is "volume +3."

When a speech of a voice command is input from the user while the display apparatus 100 is displaying a content image 510, the display apparatus 100 determines whether the voice command is a simple sentence or a descriptive sentence.

If the voice command is "volume up," the display apparatus 100 may autonomously retrieve and determine the operation "volume +3" corresponding to the voice command. In this case, the display apparatus 100 may perform an operation of turning up the volume of the content image 510 by three levels and display an image 520 relevant to the operation along with the content image 510. The relevant image 520 may include, for example, a visual mark to represent turning up the volume.

On the other hand, if the voice command is "please turn up the sound," it is difficult for the display apparatus 100 to autonomously determine the operation corresponding to the voice command and the interactive server 30 is involved in analyzing the voice command of the descriptive sentence. In this case, the display apparatus 100 performs an operation of turning up the volume of the content image 510 by three levels according to analysis and control by the interactive server 30 and display the image 520 relevant to the operation along with the content image 510. Also, the display apparatus 100 displays a guide image 530 notifying the user of the voice command of the simple sentence "volume up" to perform the operation "volume +3" along with the content image 510.

The user realizes through the guide image 530 that the voice command "volume up" may be switched with "please turn up the sound." Thus, to perform the operation "volume +3" the next time, the user utters "volume up" instead of "please turn up the sound," thereby relatively saving time to perform the operation.

Alternatively, unlike the foregoing exemplary embodiment, a particular operation may be performed as a plurality of voice commands are sequentially input.

Figure 7:
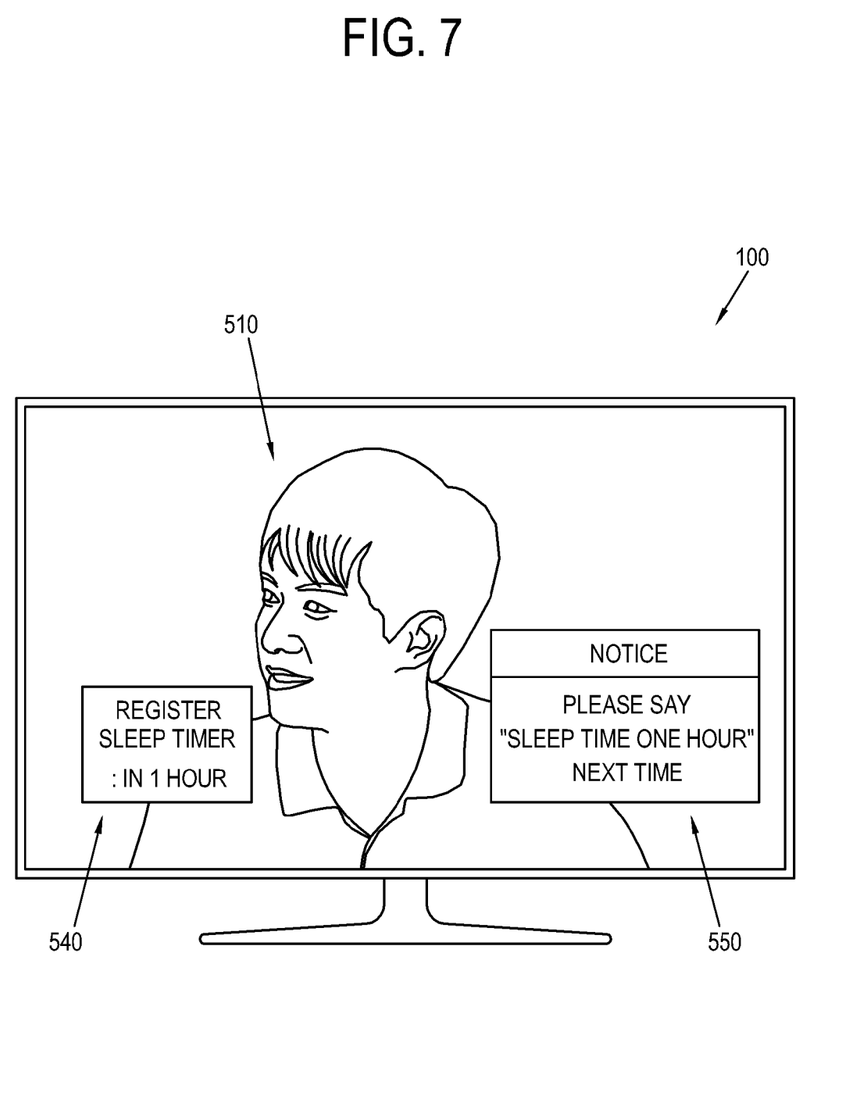
FIG. 7 illustrates a guide image displayed on a display apparatus according to a second exemplary embodiment.

FIG. 7 illustrates a guide image 550 displayed on the display apparatus 100 according to a second exemplary embodiment.

As shown in FIG. 7, an operation "turn off system" corresponding to a voice command "sleep timer" involves determining when to shut down the system. When voice commands "sleep timer" and "one hour" are sequentially input, the display apparatus 100 performs a shut-down operation in one hour from current time.

Also, when a voice command "sleep timer one hour" is input to the display apparatus 100 at a time, the same operation may be performed. That is, the operation of shutting down the display apparatus 100 in one hour from the current time may be performed both when the voice commands "sleep timer" and "one hour" are sequentially input and when the voice command "sleep time one hour" is input at a time.

If the user sequentially inputs a command respectively corresponding to the voice commands "sleep timer" and "one hour," the display apparatus 100 performs the operation of shutting down the display apparatus 100 in one hour according to the voice commands and displays an image 540 relevant to the operation.

Also, the display apparatus 100 displays a guide image 550 recommending the preset voice command "sleep timer one hour" so as to simply perform the operation.

The user sees the guide image 550 and accordingly may input the command corresponding to the voice command "sleep timer one hour" instead of sequentially inputting the command respectively corresponding to the voice commands "sleep timer" and "one hour" the next time. Accordingly, the display apparatus 100 may perform the corresponding operation in a simple way and with less time.

In the foregoing exemplary embodiments, a user's speech input to the display apparatus 100 is converted into a voice command by the STT server 30. Further, the simple sentence processing process is a process that a voice command is processed autonomously by the audio processor 170 of the display apparatus 100, and the descriptive sentence processing process is a process that a voice command is processed by the interactive server 30 and a processed result is transmitted to the display apparatus 100.

However, these exemplary embodiments are not limited to the illustrated examples, but a configuration for converting a user's speech into a voice command and an agent for processing a voice command based on whether the voice command is a simple sentence or a descriptive sentence may have different structures from those in the aforementioned exemplary embodiments.

Figure 8:
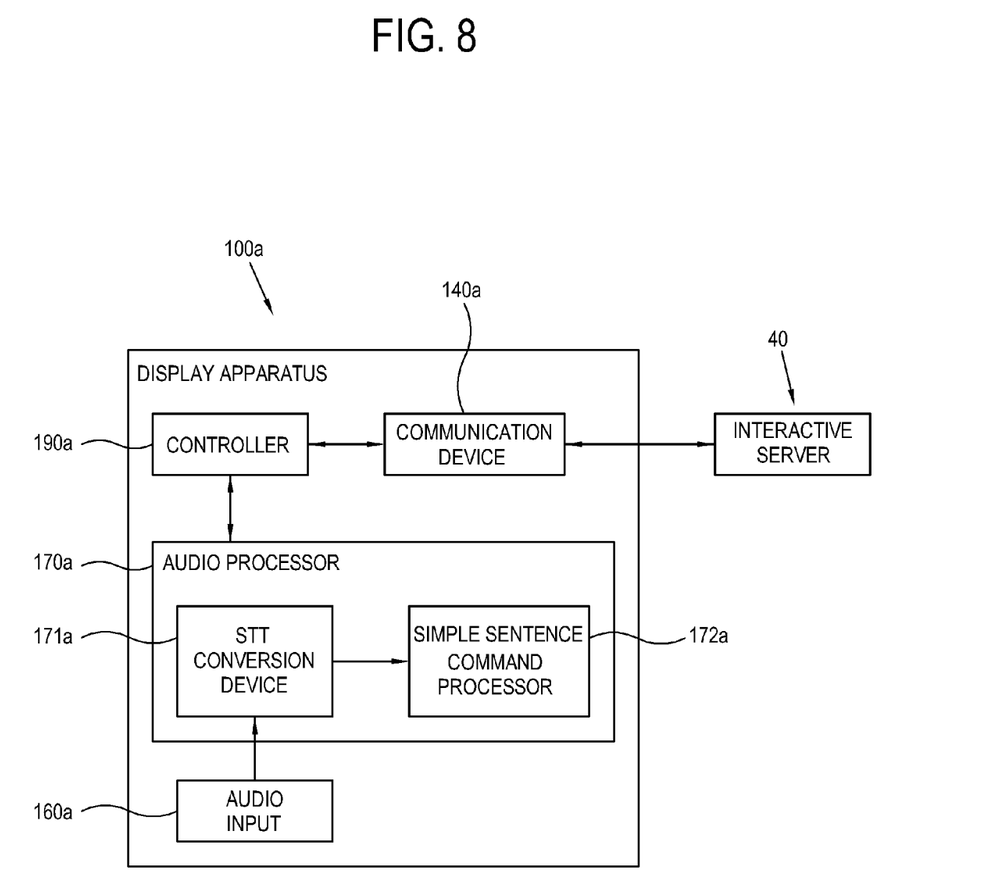
FIG. 8 is a block diagram illustrating a configuration of a display apparatus and a server according to a third exemplary embodiment.

FIG. 8 is a block diagram illustrating a configuration of a display apparatus 100*a* and a server 40 according to a third exemplary embodiment.

As shown in FIG. 8, the display apparatus 100*a* includes a communication device 140*a*, an audio input 160*a*, an audio processor 170*a*, and a controller 190*a*.

Here, the audio processor 170*a* includes a STT conversion device 171*a* which converts a speech transmitted from the audio input 160*a* into a voice command, and a simple sentence command processor 172*a* which processes a voice command of a simple sentence.

When a speech is input from the user, the audio input 160*a* transmits an audio signal of the inputted speech to the STT conversion device 171*a*. The STT conversion device 171*a* analyses the audio signal transmitted from the audio input 160*a* and converts the audio signal into a voice command including content of the speech. The STT conversion device 171*a* transmits the converted voice command to the simple sentence command processor 172*a* according to control by the controller 190*a*. That is, the STT conversion device 171*a* may perform the same function as that of the STT server 20 of the first exemplary embodiment.

The simple sentence command processor 172*a* determines an operation corresponding to the voice command like the audio processor 170 of the first exemplary embodiment. The simple sentence command processor 172a analyses the voice command according to control by the controller 190a and performs the corresponding operation according to an analysis result. Analyzing and performing the voice command are carried out in the same manner as described above, and thus detailed descriptions thereof will be omitted.

If the voice command is a descriptive sentence, the simple sentence command processor 172a may not process the voice command. In this case, the controller 190a transmits the voice command to the interactive server 40 through the communication device 140a. The interactive server 40 may perform the same function as that of the interactive server 30 of the first exemplary embodiment.

Accordingly, the display apparatus 100a performs an operation corresponding to a control signal received from the interactive server 40.

Figure 9:
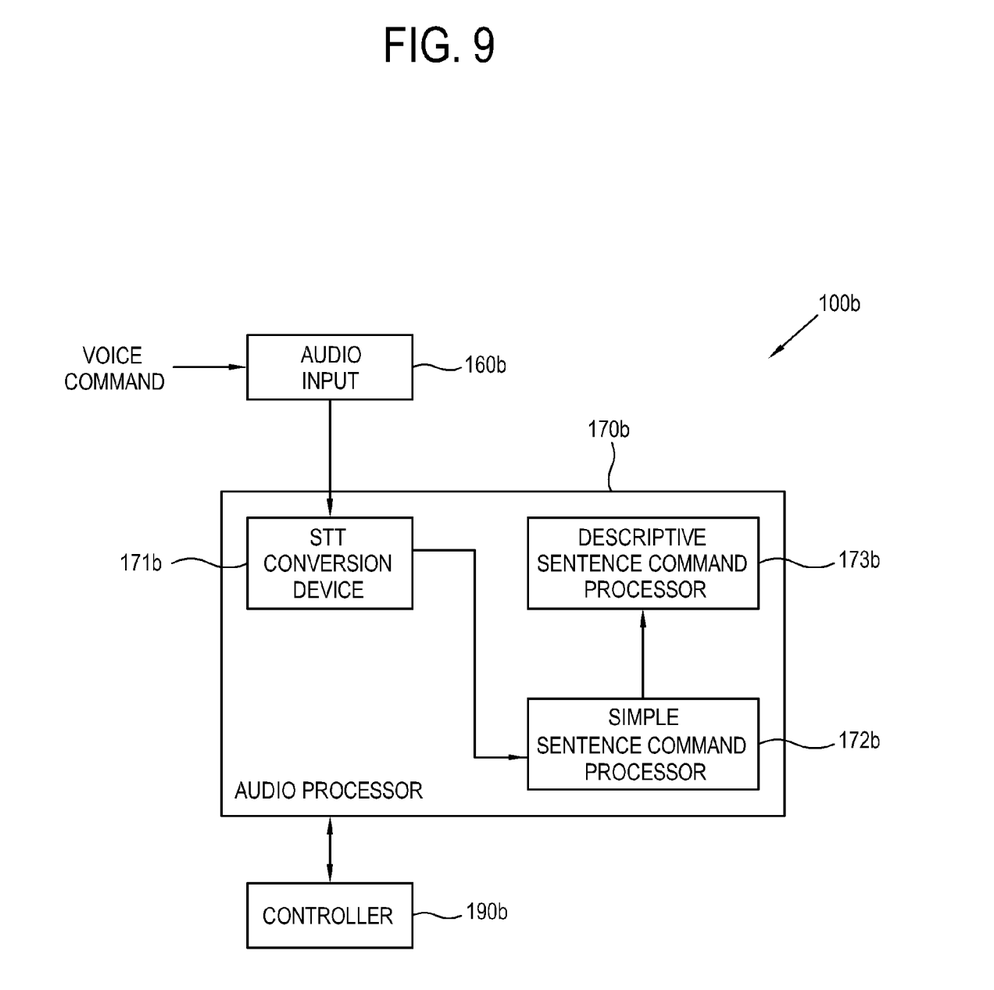
FIG. 9 is a block diagram illustrating a signal transfer structure of an audio processor of a display apparatus according to a fourth exemplary embodiment.

FIG. 9 is a block diagram illustrating a signal transfer structure of an audio processor 171b of a display apparatus 100b according to a fourth exemplary embodiment.

As shown in FIG. 9, the audio processor 170b includes a STT conversion device 171b which converts a user's speech transmitted from an audio input 160b into a voice command, a simple sentence command processor 172b which processes the voice command converted by the STT conversion device 171b if the voice command is a simple sentence, and a descriptive sentence command processor 173b which processes the voice command converted by the STT conversion device 171b if the command is a descriptive sentence or natural language command. The audio processor 170b is not limited to the foregoing configuration, which is provided only to briefly show information directly associated with the present exemplary embodiment.

When a speech is input from the user, the audio input 160b transmits an audio signal of the input speech to the STT conversion device 171b. The STT conversion device 171b converts the speech transmitted from the audio input 160b into a voice command including content of the speech. The STT conversion device 171b transmits the converted voice command to the simple sentence command processor 172b first.

The simple sentence command processor 172b determines an operation corresponding to the voice command like the audio processor 170 of the first exemplary embodiment. The simple sentence command processor 172b analyzes the voice command according to control by the controller 190b and performs the corresponding operation according to an analysis result.

If the voice command is a descriptive sentence, the simple sentence command processor 172b may not process the voice command. In this case, the controller 190b transmits the voice command to the descriptive sentence command processor 173b.

The simple sentence command processor 172b may perform substantially the same function as the simple sentence command processor 172a of FIG. 8. Further, the descriptive sentence command processor 173b performs a function that the interactive servers 30 and 40 conduct in the foregoing exemplary embodiments.

That is, unlike in the aforementioned exemplary embodiments, the display apparatus 100b according to the present exemplary embodiment autonomously converts a voice command based on a user's speech and analyzes an operation corresponding to the voice command without performing transmission and reception of data/signals with the external servers 20, 30 and 40.

Even in this case, the voice command is processed by the simple sentence command processor 172b first. Further, if the simple sentence command processor 172b cannot process the voice command, the voice command is then processed by the descriptive sentence command processor 173b. Thus, the idea of the first exemplary embodiment may be also applied to the present exemplary embodiment.

Although a few exemplary embodiments have been shown and described, it will be appreciated by those skilled in the art that changes may be made in these exemplary embodiments without departing from the principles and spirit of the application, the scope of which is defined in the appended claims and their equivalents.

What is claimed is:

1. An image processing apparatus comprising:
an image processor configured to process an image signal and display the processed image;
an audio input configured to input a user's speech;
a storage configured to store a list of simple voice commands and an operation corresponding to each of the simple voice commands;
a communication device configured to communicate with a server that analyzes a descriptive voice command and determine an operation corresponding to the descriptive voice command;
an audio processor configured to process a voice command corresponding to the user's speech to conduct the operation corresponding to a simple voice command in the list if the first voice command is the simple voice command in the list, and to transmit the voice command to the server through the communication device if the voice command is not the simple voice command in the list; and
a controller configured to, if an operation for the voice command determined by the server corresponds to the simple voice command in the list, display a guide image which recommends the corresponding simple voice command in the list,
wherein the simple voice command is shorter than the descriptive voice command.

2. The image processing apparatus of claim 1, wherein the controller determines the operation corresponding to the voice command according to a control command transmitted from the server based on the voice command.

3. The image processing apparatus of claim 1, wherein a time from a point when the user's speech is input to the audio input to a point when the corresponding operation is performed is shorter when the voice command is the simple voice command than when the first voice command is the descriptive voice command.

4. The image processing apparatus of claim 1, wherein the controller displays a second guide image which recommends a preset second voice command when a plurality of voice commands respectively corresponding to a plurality of user speeches are sequentially input in a state that a preset corresponding operation is set to be performed depending on when the plurality of voice commands are sequentially input or when the second voice command is input.

5. The image processing apparatus of claim 1, wherein the communication device communicates with a speech-to-text (STT) server to convert the user's speech into a voice command of a text, and the controller transmits an audio signal of the speech to the STT server and receives the voice command corresponding to the speech from the STT server when the speech is input to the audio input.

6. The image processing apparatus of claim 1, further comprising a display configured to display the image signal processed by the image processor as an image.

7. A control method of an image processing apparatus, the method comprising:
  inputting a user's speech;
  performing an operation corresponding to a simple voice command in a list stored in the image processing apparatus if a voice command corresponding to the user's speech is the simple sentence voice command in the list, the list comprising simple voice commands and an operation corresponding to each of the simple voice commands; and
  transmitting the first voice command to a server if the voice command corresponding to the user's speech is not the simple voice command in the list, the server configured to analyze a descriptive voice command and determine an operation corresponding to the descriptive voice command,
  wherein the transmitting the voice command to the server comprises, if an operation for the voice command determined by the server corresponds to the simple voice command in the list, displaying a guide image which recommends the corresponding simple voice command in the list,
  wherein the simple voice command is shorter than the descriptive voice command.

8. The control method of claim 7, wherein the displaying the guide image comprises determining the operation corresponding to the voice command according to a control command transmitted from the server based on the voice command.

9. The control method of claim 7, wherein a time from a point when the user's speech is input to an audio input to a point when the corresponding operation is performed is shorter when the voice command is the simple voice command than when the voice command is the descriptive voice command.

10. The control method of claim 7, further comprising:
  displaying a second guide image that recommends a preset second voice command when a plurality of voice commands respectively corresponding to a plurality of speeches are sequentially input in a state that a preset corresponding operation is set to be performed depending on when the plurality of voice commands are sequentially input or when the second voice command is input.

11. The control method of claim 7, wherein the inputting the user's speech comprises transmitting an audio signal of the speech to a speech-to-text (STT) server to convert the speech into a voice command of a text and receiving the voice command corresponding to the speech from the STT server.

12. An image processing system comprising:
  an image processing apparatus configured to process an image signal and display the processed image signal; and
  a server configured to communicate with the image processing apparatus,
  wherein the image processing apparatus comprises
  an audio input configured to input a user's speech;
  a storage configured to store a list of simple voice commands and an operation corresponding to each of the simple voice commands;
  a communication device configured to communicate with the server which analyzes a descriptive voice command and determine an operation corresponding to the descriptive voice command;
  an audio processor configured to process a voice command corresponding to the user's speech and conduct the operation corresponding to a simple voice command in the list if the voice command is the simple voice command in the list, and configured to transmit the voice command to the server through the communication device if the voice command is not the simple voice command in the list; and
  a controller configured to, if an operation for the voice command determined by the server corresponds to the simple voice command in the list, display a guide image which recommends the corresponding simple voice command in the list,
  wherein the simple voice command is shorter than the descriptive voice command.

13. The image processing system of claim 12, wherein the storage is configured to store a list of simple sentence voice commands and operations corresponding to each simple sentence voice command.

14. An image processing apparatus comprising:
  a display;
  an audio input device configured to input a user's speech; and
  a controller configured to perform a preset first operation if a voice command corresponding to the user's speech is any one of a first voice command of a simple sentence and a second voice command of a descriptive sentence,
  wherein, in response to determining that the voice command corresponding to the user's speech is the second voice command, the controller performs the preset first operation and displays, on the display, a guide image which recommends that the user uses the first voice command instead of the second voice command to perform the preset first operation a subsequent time, and
  wherein the first voice command is shorter than the second voice command.

* * * * *